United States Patent [19]

Edwards et al.

[11] Patent Number: 4,730,113
[45] Date of Patent: Mar. 8, 1988

[54] SAFETY SYSTEM FOR A LASER-UTILITY FACILITY

[75] Inventors: Stanley A. Edwards, Wallesey; Robert Hunt, Orpington; Daniel R. Lobb, Chislehurst, all of England

[73] Assignee: United Kingdom Atomic Energy Authority, London, England

[21] Appl. No.: 827,098

[22] Filed: Feb. 7, 1986

[30] Foreign Application Priority Data

Feb. 19, 1985 [GB] United Kingdom ................ 8504168
Mar. 22, 1985 [GB] United Kingdom ................ 8507505
Nov. 21, 1985 [GB] United Kingdom ................ 8528719
Jan. 30, 1986 [GB] United Kingdom ................ 8602224

[51] Int. Cl.$^4$ .......................... G01J 5/08; G08B 21/00
[52] U.S. Cl. .................................... 250/347; 250/342; 250/354.1; 219/121 LB; 219/121 LZ
[58] Field of Search .................. 250/354.1, 353, 347, 250/340, 342, 334; 219/121 LB, 121 LA, 121 LX, 121 LZ; 324/600

[56] References Cited

U.S. PATENT DOCUMENTS

| | | | |
|---|---|---|---|
| 3,749,928 | 7/1973 | Jamet et al. | 250/347 |
| 3,924,130 | 12/1975 | Cohen et al. | 250/347 |
| 4,087,691 | 5/1978 | Agerskans et al. | 250/347 |
| 4,567,367 | 1/1986 | Brown de Colstoun et al. | 250/347 |

FOREIGN PATENT DOCUMENTS

| | | | |
|---|---|---|---|
| 156887 | 9/1982 | Japan | 219/121 LZ |
| 97788 | 6/1984 | Japan | 219/121 LA |
| 2108742 | 5/1983 | United Kingdom | 219/121 L X |

*Primary Examiner*—Carolyn E. Fields
*Attorney, Agent, or Firm*—William R. Hinds

[57] ABSTRACT

A safety system for a laser-beam utilizing facility incorporates a safety enclosure (24) and an infra-red monitoring system (32) for detecting the development of hot spots at internal surfaces of the enclosure walls (24) and ceiling (26) which may occur as a result of stray laser radiation impinging on such surfaces. The development of a hot spot leads to shutting off the laser source (10) or interruption of the beam by means of a shutter (22).

27 Claims, 7 Drawing Figures

SAFETY SYSTEM FOR A LASER-UTILITY FACILITY

This invention relates to a safety system. particularly for use in a laser-utilising facility, In one system currently in use, a safety enclosure construction is used which comprises double-skinned walls fabricated from polycarbonate materials (e.g. "Perspex"—Registered Trade Mark), steel or aluminium with a sandwich filling of for example water, sand or graphite. Such constructions are intended to provide barriers to penetration of stray laser beam power for a prescribed period of time, for example five minutes, within which the fault condition can be expected to be detected.

Where, for example, water filled double-skinned walls are used to provide viewing windows, the space between the skins must be reliably sealed and is connected to a header tank so that, in the event of penetration of the inner skin by a stray laser beam, the water escaping from the penetration is replaced by water from the header tank which, in turn, may be float controlled to maintain a substantially constant water level within the tank and prevent penetration of the outer skin. To enable a fault condition to be detected suitable instrumentation is provided to monitor for the presence of water in the wall and supply of water from the tank to the wall.

Safety provisions also have to be applied to the ceiling and one proposal involves fabricating the ceiling structure from an array of water-filled copper trays with a top-up supply and instrumentation to monitor the water levels in the trays and detect supply of top-up water in the event of water loss resulting from penetration by a stray laser beam.

Such wall and ceiling constructions and the associated instrumentation are expensive and, with the advent of increasingly powerful lasers, enclosure construction costs based on existing designs will inevitably spiral if existing standards of safety are to be realised for lasers with power outputs of the order of 5 KW, especially when used in tandem to give 10 KW total beam power. Moveover, difficulties are encountered with reliability of water seals especially in the case of water-filled windows of areas in excess of 0.5 m$^2$.

The object of the present invention is to provide an improved safety system for a laser-utilising facility which enables the expense of sandwich fillings and associated instrumentation and the attendant sealing problems with water-filled constructions to be avoided.

According to the present invention there is provided a safety system for a laser beam-utilizing facility, comprising an enclosure housing said facility, radiation-sensitive sensor means for receiving the radiation emitted by at least one surface or wall forming, or located within, said enclosure, on which wall(s) or surface(s) the laser beam is only incident in the event of a malfunction of said facility, said sensor means producing an output signal dependent upon the radiation received thereby, and means responsive to the sensor means for modifying operation of the laser beam-utilizing facility in response to levels of emitted radiation, or changes thereof, in excess of a threshold value or values.

In practice, the sensor means may respond to infra-red radiation and may be used to monitor those surfaces, e.g. wall and ceiling surfaces, of the enclosure on which the laser beam should not normally be incident. Consequently, if the laser beam strays from its designed path of travel within the enclosure and impinges on a surface being monitored, the resulting increase in temperature of such surface will be registered by the sensor means and modification of laser operation to remove the potential hazard is effected.

Such modification may for instance involve disabling operation of the laser or interrupting the beam by means of a shutter device for example. In addition, audible and/or visual signalling means may be operated to alert operators to the fault condition.

Commercial infra-red sensors currently available, for instance those employing infra-red sensitive lead selenide, cadmium mercury telluride or lead tin telluride materials, exhibit rapid response times to variations in levels of emitted radiation. It is therefore feasible for a safety enclosure in accordance with the invention to be constructed without water, sand, graphite etc. fillings since the incidence of stray laser beam power on an enclosure wall or the enclosure ceiling can be detected and acted upon before any significant burn through of the construction materials occurs.

The sensor means employed in the invention may be of the quantum detector type employing materials such as those referred to above in which the band gap energy is less than the photon energy of radiation emitted by the enclosure surfaces. Such detectors may be photo-voltaic or photoconductive and may be provided with a cooling device for cooling the detector to cryogenic temperature so as to increase sensitivity.

The sensor means is conveniently associated with optical means, for providing a wide field of view. The sensor means may comprise a single detector or a plurality of detectors.

The detector or detectors may form part of a scanning system whereby the field of view seen by the detector(s) is scanned over the enclosure surfaces to be monitored.

Where a single detector is employed, this may be mounted for scanning movement relative to the enclosure surfaces, e.g. it may be mounted for continuous rotation or rotational indexing. Alternatively, the detector may be associated with an optical system arranged to present different fields of view in succession to the detector.

Where multiple detectors are used, these may also be scanned relative to the enclosure surfaces or, alternatively, they may be stationary but oriented so that each sees a different field of view whereby all enclosure surfaces to be monitored are continually under observation by the detectors.

If desired, the detector(s) may be associated with a filter or filters for restricting the frequency band-width of radiation incident upon the detector(s).

The enclosure may also be provided with at least one controllable source of infra-red radiation, e.g. a high intensity lamp, which may be operated selectively and is located within the field(s) of view of the detector(s) to enable checking of the proper functioning of the detector(s) and/or the laser-operation modifying means.

It is envisaged that the walls and ceiling of a safety enclosure in accordance with the invention may be of double-skinned construction as previously but, because potential burn-through conditions will be detected before any breach of the inner skin can occur, it may be acceptable to omit the sandwich filling and associated top-up arrangements and instrumentation used with previous designs.

In some situations a special safety enclosure may be constructed to enclose the laser-utilising facility and, in such circumstances it will, in general, be necessary to monitor at least the majority or all of the surfaces upon which the laser beam may impinge, with the possible exception of the floor and any other walls fabricated from materials such as concrete.

In other situations however, laser beam equipment may be installed in existing enclosures which will then constitute a safety enclosure for the laser-using facility but will not have been constructed specifically for that purpose and may, in any event, be fabricated largely from materials, such as concrete, which will not be readily penetrated by a laser beam but may nevertheless include some surfaces or areas which are vulnerable with consequent risks to personnel outside the enclosure.

One example of such an enclosure is a cave or cell for the remote handling of radioactive materials such as irradiated components from nuclear reactors. Remote handling caves and cells are, for the most part, constructed from materials such as concrete which do not give cause for concern from the standpoint of penetration by laser beams but nevertheless will include a viewing window to enable external operators to control the movements of manipulators and such like within the cave or cell. Such windows are generally constructed with widely-spaced inner and outer panes with liquid filling the gap between the panes, but are vulnerable to penetration by laser beam and therefore constitute a risk to personnel where laser tools have to be used within the cave or cell, for instance in the cutting of fuel wrappers in the course of dismantling fuel sub-assemblies.

Thus, for example, in the case of a cave or cell with a viewing window, said at least one surface may comprise the internally-presented surface of the window or a surface zone including that surface of the window so that suitable remedial action can be instituted if the laser beam is incident on the window surface and/or a marginal area surrounding the window surface. The or each sensor may have its field of view masked so that it "sees" only radiation from the vulnerable surfaces.

In a preferred embodiment of the present invention there is provided a surveillance system for monitoring fluctuations of heat radiation emitted within an area, said surveillance system comprising infra-red sensor means, means for cyclically scanning the area under surveillance to provide the infra-red sensor means repeatedly with the same overall field of view, means for storing a reference infra-red radiation profile for the overall field of view produced by the cyclic scan, and means for comparing the outputs produced by said sensor means during each scan cycle with the stored reference profile whereby localised changes in the level of infra-red emission within said field of view can be detected.

The reference profile may be derived from the sensor means by performing scanning of the area under surveillance in circumstances when any potential hazard is known not to exist, e.g. prior to energizing, or during correct operation of, the laser where the system is to be used to detect an errant laser beam. The reference profile may be of a volatile nature in the sense that it may be varied to take into account for example diurnal variations in temperature within the area under surveillance. Thus, for instance, the system may be arranged to update the stored reference profile by performing a reference scan at predetermined intervals, the updated reference profile thereafter being used as the basis for comparison with the outputs of the sensor means produced during subsequent scanning cycles.

The reference profile is conveniently stored in digitalised form, is a large number of discrete digital values each associated with a respective incremental zone or "pixel" of the overall field of view. Thus, during scanning, the sensor means views the overall field of view as a cyclic sequence of incremental zones and the output(s) produced by the sensor means while viewing each such incremental zone can be compared, either instantaneously or subsequently, with the corresponding digital value of the reference profiles.

The system preferably includes threshold means for discriminating between those deviations from the reference profile which are attributable to non-hazardous fluctuations in the level of infra-red radiation detected (which will tend to vary slowly with time) from those which are attributable to potentially hazardous sources, such as a stray laser beam. The threshold means may discriminate on the basis of changes in magnitude above and/or magnitude changes coupled with rate of change.

Typically the overall field of view seen by the sensor means will be 360 degrees in the horizontal plane and at least 120 degrees in the vertical plane.

Also in accordance with the invention there is provided apparatus for monitoring infrared emissions comprising sensor means responsive to infrared radiation for producing an electrical output related to the intensity of infrared radiation incident thereon, scanning means for effecting a cyclical scan to provide the sensor means, in use of the apparatus, repeatedly with an overall field of view encompassing an area under surveillance, said scanning means including an anamorphic lens means for providing said sensor means with a refracted instantaneous field of view which is scanned in a direction generally orthogonal to its wide angle of view to provide the sensor means with said overall field of view, means for analyzing the outputs of the sensor means with reference to a predetermined threshold value or values to detect within said overall field of view arising sources of infrared radiation representing potentially hazardous conditions, and means for generating an actuating signal in the event of detection of such sources.

Apparatus in accordance with the invention for monitoring infrared emissions also comprises (a) sensor means responsive to infrared radiation for producing an electrical output related to the intensity of infrared radiation incident thereon; (b) scanning means for effecting a cyclical scan to provide the sensor means, in use of the apparatus, repeatedly with an overall field of view encompassing an area under surveillance, said scanning means comprising a support, a scanning head mounted on the support for rotation about a predetermined axis, drive means for effecting continuous rotation of the scanning head about said predetermined axis, an anamorphic lens mounted by the scanning head at a location spaced radially outwardly from said predetermined axis and so that its wide angle of view extends in a plane which contains or is parallel to said predetermined axis of rotation, and beam focussing and deflecting optical components for effecting focussing of the infrared radiation refracted radially inwardly from said lens and deflecting the same along said predetermined axis for reception by said sensor means; (c) means for analyzing the outputs of the sensor means with reference to a predetermined threshold value or values to detect within said overall field of view arising sources of infrared radiation representing potentially hazardous conditions; and (d) means for generating an actuating signal in the event of detection of such sources.

Also in accordance with the invention, there is provided apparatus for monitoring infrared emissions comprising: (a) sensor means responsive to infrared radiation for producing an electrical output related to the intensity of infrared radiation incident thereon; (b) scanning means for effecting a cyclical scan to provide the sensor means, in use of the apparatus, repeatedly with an overall field of view encompassing an area under surveillance, said scanning means including an anamorphic lens for providing said sensor means with an instantaneous field of view which is scanned in a direction generally orthogonal to its wide angle of view to provide the sensor means with said overall field of view; (c) means for analyzing the outputs of the sensor means with reference to rate of change of temperature to discriminate between potentially hazardous sources of infrared radiation giving rise to rapid changes in levels of radiation emitted and non-hazardous sources of infrared radiation giving rise to slowly varying changes in levels of radiation emitted; and (d) means for generating actuating signals in the event of detection of such sources.

Other features and aspects of the invention will become apparent from the embodiments described by way of example only with reference to the accompanying drawings, in which.

Figure 1:
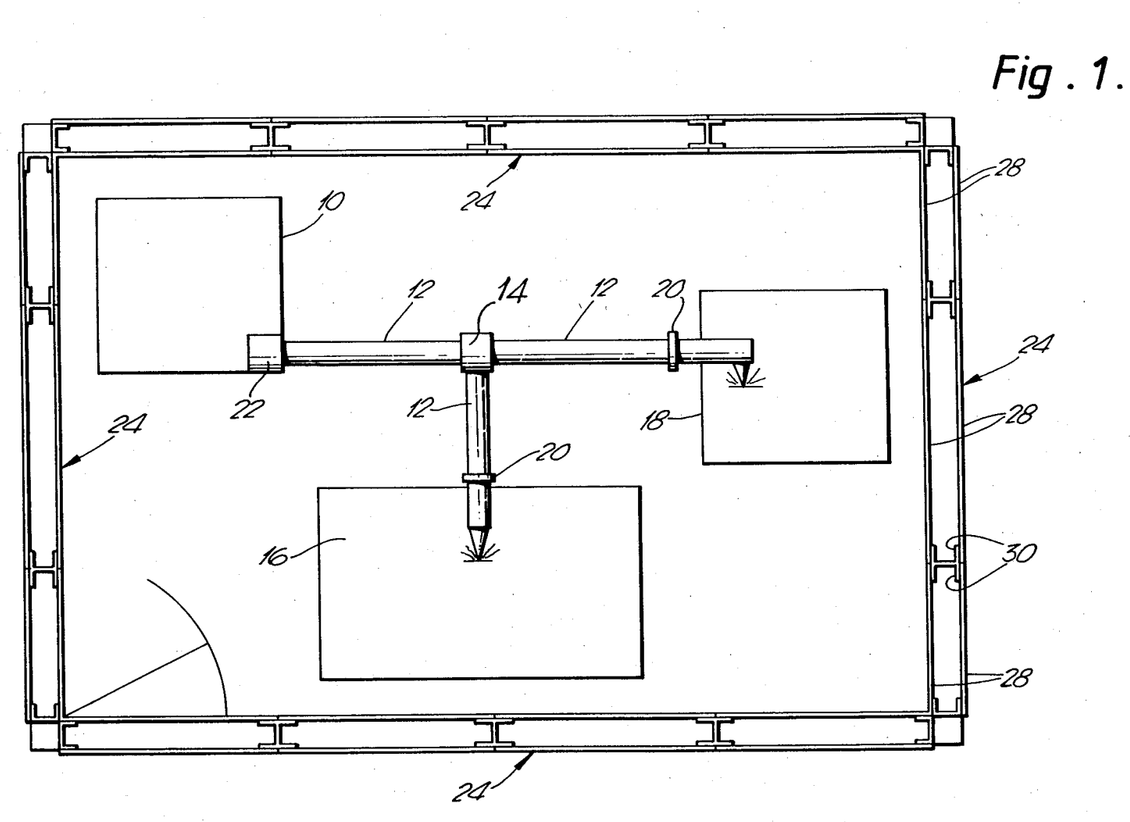
FIG. 1 is a schematic plan view of a laser-utilising facility within a safety enclosure.

As shown diagrammatically in FIG. 1, the laser facility comprises a suitably enclosed laser source 10 the beam of which is directed by means of flight tubes 12 and a switching mirror system 14 to one or other of two workstations 16, 18 in which required laser operations, such as laser welding or cutting, can be executed, each workstation being contained within an enclosure. Safety isolators 20 enable the laser beam to be blocked from entering the respective workstation enclosures. The laser source 10 is provided with a shutter device 22 which, when open, allows the beam into the beam line and can be closed, e.g. by a pneumatic double acting cylinder, to block entry of the laser beam into the flight tube system.

Figure 2:
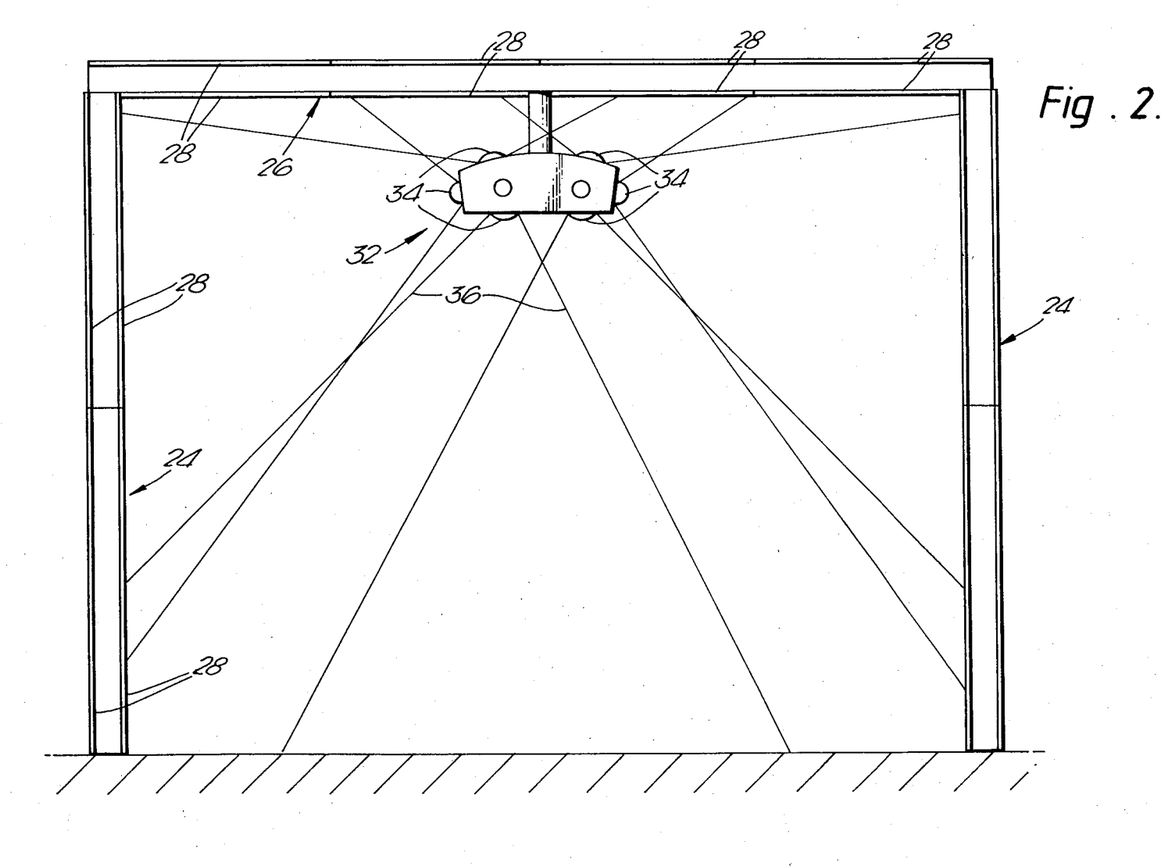
FIG. 2 is a side view, with the laser equipment omitted for clarity, and illustrating a basic form of hot spot monitoring arrangement.

The facility is housed within a safety enclosure comprising walls 24 and ceiling 26 which may be of double-skinned construction comprising cladding panels 28 of for example polycarbonate and/or steel materials attached to a supporting framework comprising, for instance, channel-section aluminium supports 30. As shown in FIG. 2, the walls 24 may comprise a lower section of steel cladding and an upper section of "PERSPEX" cladding, the latter providing viewing facilities. As previously mentioned, in a current design, the double-skinned walls are provided with a sandwich filling which consists of water in the upper sections of the walls and sand in the lower sections. Such fillings may not be necessary when the safety system according to the present invention is used.

As shown in FIG. 2, a monitoring system 32 is located within the safety enclosure and may for example be suspended from the ceiling. The monitoring system 32 may comprise one or more infra-red sensors which, in conjunction with a suitable optical system including for instance a number of lenses 34, are arranged to view all of those internal surfaces of upon which stray laser beam power might impinge in the event of fault conditions arising. A typical field of view is indicated by the lines depicted by numeral 36 in FIG. 2. In the event of stray laser beam power impinging on any one of the surfaces being monitored, a hot spot will develop which will be promptly detected by the monitoring system. In such circumstances, the monitoring system may feed an output signal to control circuitry for modifying laser operation, e.g. by shutting the laser off and operating the shutter 22 to prevent entry of the beam into the flight tube system.

Figure 3:
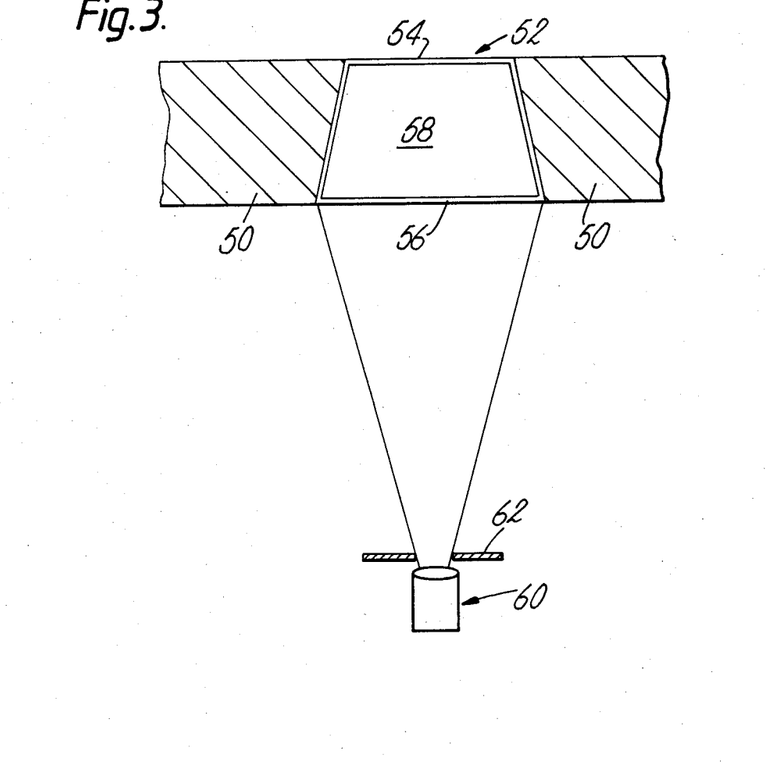
FIG. 3 is a plan view of part of a cave for remotely handling irradiated materials.

Referring to FIG. 3, this illustrates an application of the invention to a cave for handling irradiated materials such as nuclear fuel elements which are to be dismantled by laser cutting techniques. The cave is fabricated with thick concrete walls 50 in which a viewing window 52 is located. For present purposes the window 52 may be regarded as comprising an outer pane 54, and inner pane 56 facing inwardly of the cave and a body of liquid 58 filling the space between the two panes. Within the cave there is a laser beam-utilizing facility (not shown) which may comprise a laser tool such as a welding or metal cutting head mounted by remotely operable robotic equipment. To ensure that the laser beam does not impinge on the window either at all or at least for a length of time sufficient to risk penetration of the inner pane (and hence loss of liquid and radiation shielding), the surface of the inner pane is monitored by means of an infra-red sensor device 60 the field of view of which is restricted by a mask 62 so as to coincide with the perimeter of the window. Thus, the sensor device will only respond to the incidence of the laser beam on the window but not on the walls 50. If the level of radiation sensed by the sensor 60 exceeds a predetermined threshold this condition may be used to disable the laser in the manner described previously and/or operate some form of warning device.

Figure 4:
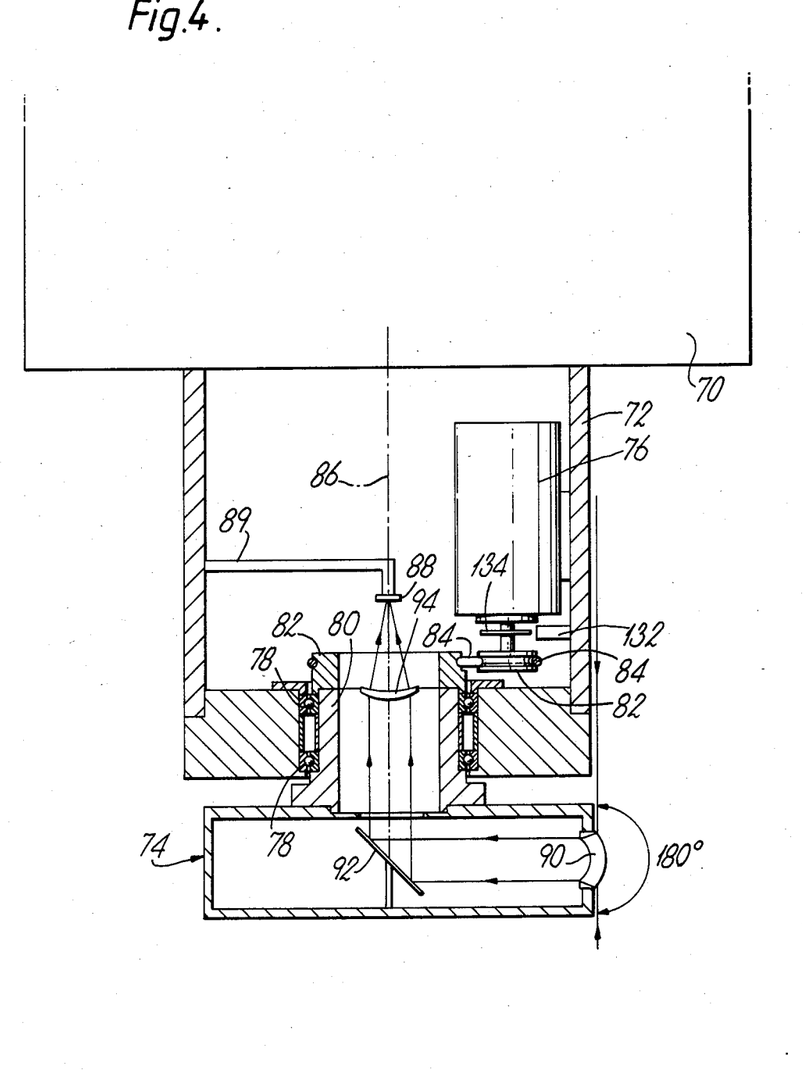
FIG. 4 is a schematic partly vertically-sectioned view showing a hot spot monitoring arrangement having a scanning facility.

In the embodiments of FIGS. 1 to 3, the monitoring arrangements have a fixed field of view and, where the area to be monitored is extensive as in FIGS. 1 and 2, a scanning arrangement will in general be preferable. FIG. 4 illustrates one form of scanning arrangement and comprises a fixed upper housing 70, a fixed lower housing 72 and a scanning head 74. The upper housing 70 may for example be secured at a suitable vantage point to the ceiling of a safety enclosure such as that illustrated in FIGS. 1 and 2 and may accommodate electronic circuitry (to be described below) and power supply circuitry for the electronics and an electric drive motor 76 housed within the lower housing 72. The base of the lower housing 72 rotatably mounts, via bearings 78, a tubular shaft 80 to the lower end of which the scanning head 74 is secured. The motor 76 and the shaft 80 are coupled by a belt and pulley drive 82,84 so that the scanning head can be scanned around the axis 86.

An infra-red sensor 88, e.g. a lead selenide cell, is mounted along the axis 86 by arm 89 which may be fixed to the lower housing 72 as shown or may be connected to the driven pulley 82 or shaft 80. Infra-red radiation from the surroundings is collected by an optical system and focussed on the sensor 88. Thus, as illustrated, the optical system comprises a wide angle lens 90 acting as an anamorphic lens, a beam-folding mirror 92 and a focussing lens 94 all mounted for rotation with the scanning head 74 (although it is not essential for the lens 94 to rotate with the scanning head). The lens 90 is a cylindrical lens and the optical system comprising sensor 88, lenses 90 and 94 and mirror 92 may have an instantaneous field of for example 180°×1°, i.e. 180° in a vertical plane and 1° in a horizontal plane. It should be understood that these values are merely given by way of example and may vary according to requirements; for instance it is envisaged that the angle subtended in the vertical plane may range from 90° to 220° depending on requirements. The sensor 88 is located at the focal surface of lens 94 so that, in the horizontal section in which lens 90 has no power, the sensor 88 and lens 94 define the horizontal field angle of the instantaneous field as w/f radians (where w is the width of the sensor and f is the focal length of lens 94). The lens 90 has the effect of extending the range of angles from which radiation reaches the sensor, in the vertical section, to 180°. As the scanning head 74 rotates (typically at a speed giving at least one complete scan per second), the field of view provided by the optical system is passed through 360° thereby giving a very extensive overall field of view, i.e. 360° in a horizontal plane and, in the illustrated embodiment, 180° in a vertical plane.

In many situations, a single scanning arrangement such as that shown in FIG. 4 will suffice; however, if needed to provide adequate coverage, an additional scanning arrangement or arrangements as illustrated in FIG. 4 may be provided so that the scanning arrangements collectively provide coverage of all potentially vulnerable surfaces. In the embodiment illustrated in FIG. 4, the cylindrical lens 90 subtends 180° in a vertical plane but a lesser angle may be adequate for some applications in which only certain surfaces are vulnerable and in this event the lens 90 may be masked to limit the viewing angle as required.

The scanning speed is controllable by the motor 76 and, if desired, may be selectively variable by varying the motor speed, e.g. by way of operator-actuable controls. The speed of scanning will in turn govern the degree of temperature resolution achievable, i.e. the slower the scanning speed the higher the temperature resolution achievable. By permitting variation in scanning speed, the monitoring equipment can be used both for rapidly detecting hot spots generated by laser beam impingement on enclosure surfaces (in which case, high scanning speeds are appropriate) and detecting other conditions leading to less substantial increases in infra-red radiation emission (in which case, slower scanning speeds are appropriate). Thus, for example, in general safeguards are necessary to ensure that personnel are excluded from the safety enclosure during laser operation. The presence of personnel within the enclosure can be detected by virtue of the level of infra-red radiation emitted and such radiation levels can be detected with the aid of slower scanning speeds. If necessary, two scanning arrangements may be employed which operate at scanning speeds compatible with hot spot and personnel detection respectively (using different threshold levels for radiation detection) so that if either scanning arrangement registers the condition monitored, i.e. development of a hot spot or presence of personnel, appropriate disabling of laser operation is initiated accompanied by generation of an alarm signal. Alternatively, as described hereinafter, the same scanning arrangement may be used to monitor both types of condition. Typically the fast scan rate will be greater than one complete scan per second and may be of the order of a scan every 100 milliseconds, while the slow scan rate may be of the order of several seconds.

Although as shown in FIG. 4, the instantaneous field of view provided by the optical system is of greatly extended configuration (the long and short dimensions being in a ratio of at least 50:1 and typically of the order of 120:1 to 220:1), a compact instantaneous field of view (i.e. having mutually orthogonal dimensions of the same order) may be employed by arranging for the latter to be scanned in mutually orthogonal planes using expedients such as continuously rotating mirror polygons or mirrors driven angularly by galvonometers, typically providing linear ramp deflection with fast flyback. Thus, for example, a rotating mirror polygon may be used to generate a rapid scan in a vertical plane while the mirror polygon is panned at a slower rate about a vertical axis (e.g. 30-60 rpm). However, the use of an extended instantaneous field of view as in FIG. 4 is preferred since the mechanical drive arrangement can be simpler and high speed movements of optical components are not required.

Figure 5:
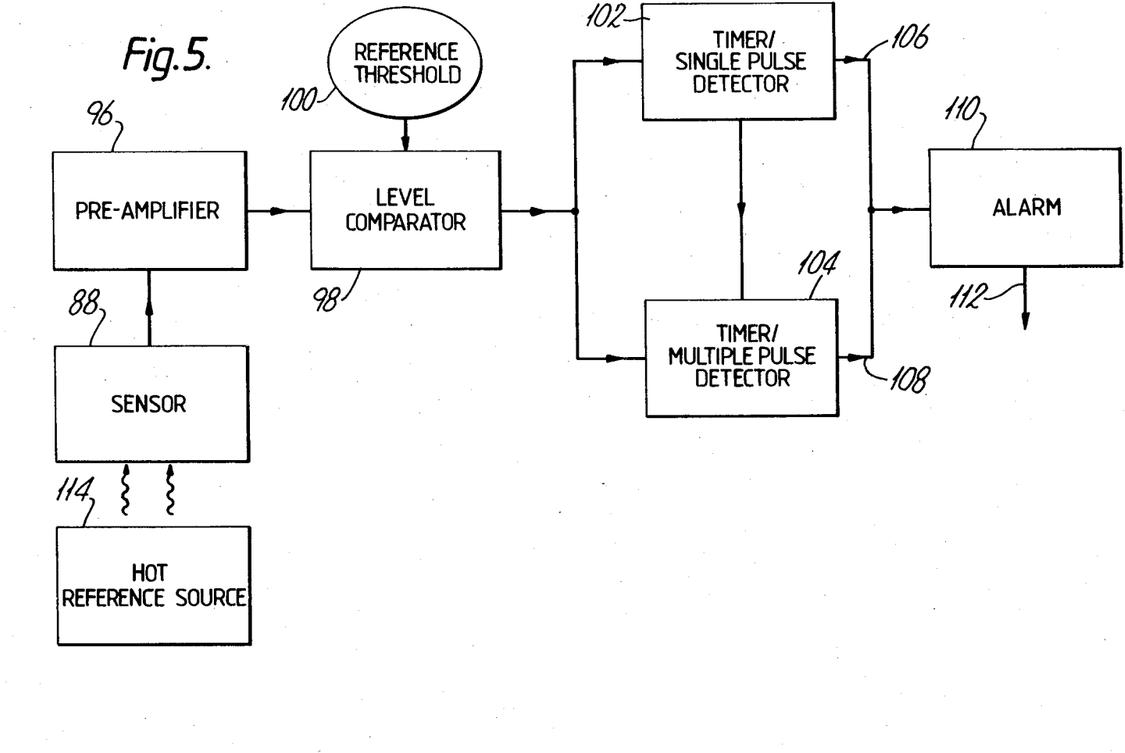
FIG. 5 is a circuit block diagram of signal processing circuitry for use with the arrangement of FIG. 4.

FIG. 5 illustrates diagrammatically electronic circuitry for processing the outputs of the sensor 88. The sensor 88 is connected to a pre-amplifier circuit 96 and the amplified output is connected to one input of a level comparator 98 having a second input connected to a circuit 100 providing a reference threshold value which may be selectively variable and will in general be preset to a value corresponding to the maximum infra-red emissions acceptable, i.e. so that a hot spot resulting from impingement of an errant laser beam on a wall of the enclosure is readily distinguishable from normal background levels of infra-red emission in the work area. If the input from the sensor 88 exceeds the preset threshold value, the comparator 98 provides an output which is fed to two timing circuits 102, 104 which function to trigger, via respective outputs 106, 108, a circuit 110 for generating an alarm signal in the event either of an undesirable hot spot being detected or of malfunctioning of the sensor 88 or electronics. The circuit 110 also initiates, via output 112, appropriate disabling of laser operation as previously described.

The safeguard against malfunctioning of the sensor 88 or electronics is implemented by deliberately providing a hot reference source 114 at a known position within the overall field of view traversed during each scan. For example, a hot spot constituted by an electrical resistance-heated component may be located at a suitable vantage point within the enclosure so that the sensor 88 sees the reference hot spot 114 once on every scan. The two timing circuits 102, 104 operate in conjunction to discriminate between the reference hot spot 114 and any undesirable hot spots. In addition, the timing circuit 102 establishes that the reference hot spot is actually seen by the sensor 88 during each and every scan. The timing circuit 102 may comprise a retriggerable monostable having a time-out period exceeding the scanning period so that, provided the reference hot spot is detected during each scan, it is repeatedly retriggered (without timing out) by the outputs produced by comparator 98 in response to the reference hot spot. If, however, circuit 102 does time out this indicates failure to detect the reference hot spot within a scan cycle and hence initiates generation of the alarm and disabling of laser operation by circuit 110. If desired, circuit 102 may be arranged so that an output to circuit 110 is provided only if the reference hot spot fails to be detected on two or more occasions in successive scan cycles (or for example during two out of three scan cycles).

The timing circuit 104 may include a monostable triggered by the signal derived from the reference hot spot 114 and having a time out period slightly less than the scanning period and may be arranged to be armed during this timing period so as to detect hot spots other than the reference. Thus, for example, the timing circuit 104 may be implemented, in principle, in the manner indicated in FIG. 6. The output from the comparator 98 is fed via lines 116, 118 to monostable 122 and one input of an AND gate 120. On being triggered, the monostable 122 maintains an output for its timing period at the second input of AND gate 120, the monostable output being delayed by delay circuit 124 to stop the triggering pulse arriving substantially simultaneously at gate 120 via the two routes so that gate 120 does not give a spurious coincidence output on line 126 at this stage. If a second hot spot is not detected within the timing period of monostable 122 the latter times out, removes the output applied at the second input of gate 120 and awaits retriggering by the next pulse derived from the reference hot spot 114. If however a second hot spot is detected before monostable 122 times out, the resulting pulse will be routed to the first input of gate 120 via line 118 and the resulting coincidence of pulses at both inputs of gate 120 will produce an output on line 126 which is effective to operate electronic latch 128 and provide a signal for initiating operation of the alarm-/disabling initiating circuit 110. It will be seen that the reference hot spot 114 serves to trigger both circuits 102, 104 once per cycle and therefore, in addition to providing a self-testing facility for the sensor and circuitry, provides a timing reference signal for synchronising purposes and enables any significant changes in the scanning speed to be detected for instance as a result of slippage in the pulley/belt coupling between the motor 76 and shaft 80. In this event, sighting of the reference hot spot will be shifted relative to the timing periods of the timing circuits 102, 104 and if the shift is large enough, the circuits 102, 104 will indicate a malfunction.

The scanning arrangement of FIG. 4 may be used in conjunction with sampling-type electronic circuitry to obtain greater flexibility in monitoring of infra-red emissions. One implementation of such circuitry is shown schematically in FIG. 7. A position encoder 130 is associated with the scanning unit of FIG. 4 (here depicted by reference numeral 140) to provide an electrical output representative of the instantaneous point reached during each scanning cycle. The encoder 130 may comprise a proximity detector or opto-electronic switch 132 co-operable with a toothed disc 134 (see FIG. 4) carried by the drive shaft of the motor 76 so that the proximity detector or opto-switch provides a series of for example 256 pulses during each scanning cycle. The encoder may be responsive to rotation of the scanning head per se if desired so as to eliminate errors such as drive belt slip.

Figure 7:
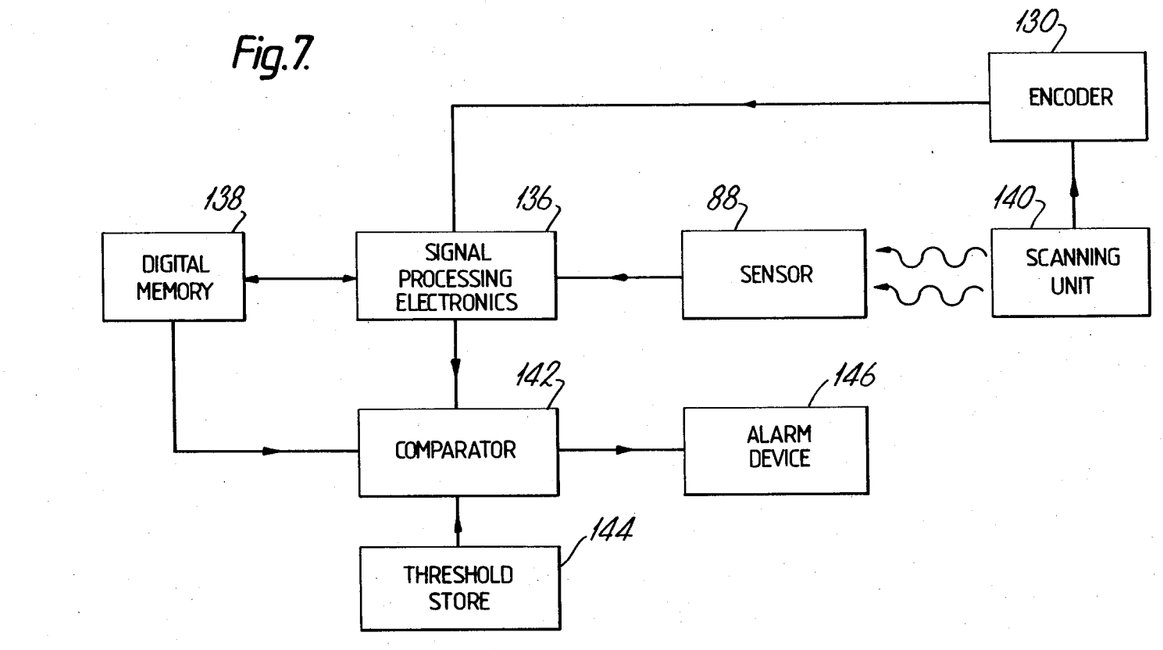
FIG. 7 is a block diagram of alternative signal processing circuitry for use with the scanning arrangement of FIG. 4.

The outputs of the sensor 88 and encoder are fed to signal processing electronics 136 which may be microprocessor based. A digital memory 138 serves to store a reference temperature profile for the overall field of view under surveillance, the store being loaded with a digital value associated with a respective one of the series of instantaneous fields (e.g. 256 such values) produced during scanning. During surveillance, the output produced by the sensor 88 is repeatedly sampled (e.g. 256 times per cycle) and is fed to a comparator 142 along with the corresponding reference value from the memory 138 and, if the difference exceeds a predetermined threshold derived from threshold store 144 during any scan or more than once in two or more scans, a device 146 is operated for initiating an alarm and/or disabling laser operation.

Typically, the scanning period will be of the order of one second or less and the interval between production of an output by the detector and operation of the warning device may be less than one second. Thus, appropriate remedial action can be taken rapidly before any hazard develops especially if, in the case of laser-monitoring, the output of the comparator 142 is also employed to disable or otherwise modify operation of the laser.

Figure 6:
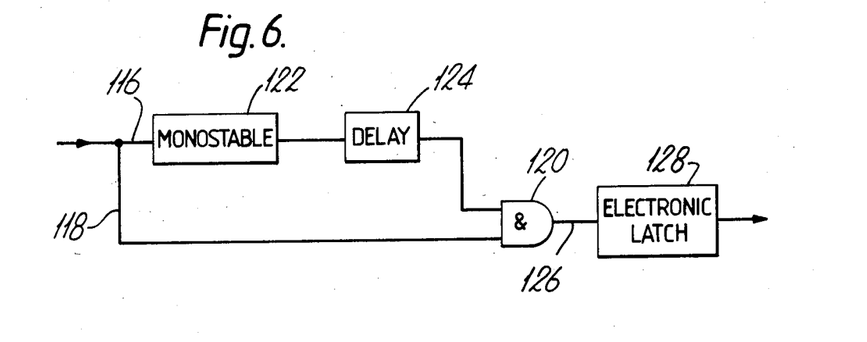
FIG. 6 is a circuit diagram corresponding to one of the timing circuits illustrated in the block diagram of FIG. 5.

As a safety measure, as described with reference to FIG. 6, a reference hot spot may be secured to a suitable fixture within the field of view (i.e. on a wall or other structure) to provide a self-check facility for the scanning unit. Thus, the reference "hot spot" should be sighted by the scanning unit at a particular point in each scan and failure to sight the reference "hot spot" may be used to initiate a warning signal. The reference "hot spot" also provides a geographical reference point within the scanning field to facilitate the identification of particular discrete zones or areas at which an alarm condition may be detected.

The reference temperature profile collectively provided by the digital values stored in the memory 138 may be obtained by initially using the scanning unit 140 to scan the area under surveillance in circumstances where any potential hazard is known not to exist, e.g. prior to energising, or during correct operation of, the laser equipment. Thus, the output of sensor 88 can be sampled for each increment in the overall scan and the values obtained may be entered at appropriate addresses in the memory 138 for retrieval at corresponding points in subsequent scans and hence for comparison by comparator 142 with the sampled outputs then prevailing for each such position.

The threshold store 144 may contain more than one threshold value so that, in the course of comparisons made by the comparator 142, different threshold values may be used for different sampling positions during the scan. The reference profile stored by memory 138 may if desired be updated by the signal processing electronics 136 at regular intervals by substituting the currently derived sample values for the previously stored values. Such updating can be effected each time a scan is executed but will more usually be effected at longer intervals, e.g. once every 60 minutes.

The signal processing electronics may process the sampled outputs from the sensor 88 in two modes. In a first mode, the samples may be compared individually with corresponding stored reference values so that the circuitry can respond immediately to any large temperature variations resulting from the development of a hot spot. In a second mode which affords a higher degree of temperature resolution, the sampled outputs may be analysed using an averaging technique whereby the samples are averaged over a relatively prolonged interval of time compared with the sampling interval and, in this mode, the comparator 142 may be operable to compare the average value with a relatively low threshold value derived from store 144, for example in order to detect sources other than laser-initiated hot spots. For instance, in the second mode (which, in effect, simulates a slower scanning rate) the unauthorised presence of personnel within the safety enclosure may be detected and, in this event, appropriate action can be taken involving for example generation of an alarm and/or disabling of laser operation.

Although shown mounted from a ceiling, the scanning arrangement of the invention may for example be mounted by means of a slender column or pole secured to the floor or other convenient mounting surface.

We claim:

1. A safety system for a laser beam-utilizing facility, comprising an enclosure housing said facility, radiation-sensitive sensor means for receiving the radiation emitted by at least one surface or wall forming, or located within, said enclosure, on which wall(s) or surface(s) the laser beam is only incident in the event of a malfunction of said facility, said sensor means producing an output signal dependent upon the radiation received thereby, and means responsive to the sensor means for modifying operation of the laser beam-utilizing facility in response to levels of emitted radiation, or changes thereof, in excess of a threshold value or values.

2. A system as claimed in claim 1 in which said sensor means forms part of scanning means providing the sensor means with an overall field of view which encompasses the surface(s) or wall(s) to be monitored.

3. A system as claimed in claim 2 including at least one reference source of radiation serving as a hot spot located at a predetermined position relative to the enclosure, said scanning means being operable to include said reference source(s) in the overall field of scanning seen by said sensor means, and said modifying means being arranged to modify laser operation only in response to radiation sources other than said reference source(s).

4. A system as claimed in claim 3 including means for selectively or periodically testing response of said sensor means and/or laser-operation modifying means to the reference source(s).

5. A system as claimed in claim 2 in which said scanning means is selectively operable to scan at different speeds.

6. A system as claimed in claim 2 in which separate sensor means and associated scanning means are located at different points relative to the enclosure, and said separate scanning means are operable at different scanning speeds with respect to one another.

7. A safety system for a laser beam-utilizing facility, comprising an enclosure housing said facility, radiation-sensitive sensor means for receiving the radiation emitted by at least one surface or wall forming, or located within, said enclosure, on which wall(s) or surface(s) the laser beam is only incident in the event of a malfunction of said facility, said sensor means producing an output signal dependent upon the radiation received thereby, scanning means for providing the sensor means with an instantaneous field of view which is scanned to produce an overall field of view encompassing said surface(s) or wall(s) and which is extended in a direction generally orthogonal to the direction in which the instantaneous field of view is scanned, and means responsive to the sensor means for modifying operation of the laser beam-utilizing facility in response to levels of emitted radiation, or changes thereof, in excess of a threshold value or values.

8. A system as claimed in claim 7 in which signal processing means is provided for deriving from said sensor means a series of output signals corresponding to successive instantaneous fields of view, said signal processing means being arranged to analyze said output signals both individually and groupwise to provide different degrees of temperature resolution.

9. A system as claimed in claim 7 in which said scanning means is operable to scan said instantaneous field of view cyclically to provide the sensor means repeatedly with the same overall field of view and further including means for storing a reference radiation profile for the overall field of view produced by the cyclic scan and means for comparing the output produced by said sensor means during each scan cycle with the stored reference profile such that any localized changes in the level of radiation emission within said overall field of view are detected.

10. A system as claimed in claim 9 including means for repeatedly sampling the output of the sensor means in the course of each scanning cycle to produce a predetermined number of signal samples corresponding to successive instantaneous fields of view within the overall field, said store means storing a number of reference signal samples each corresponding to a respective one of said successive instantaneous fields of view, and said comparing means being operable to compare each sampled output signal from the sensor means with the corresponding stored reference signal.

11. A system as claimed in claim 10 including threshold store means for storing at least one threshold value, said comparing means being operable to determine whether or not the difference between each sampled output signal and the associated stored reference signal exceeds said threshold value(s).

12. A system as claimed in claim 9, including means for periodically updating the stored reference profile using the profile obtained in the course of a scanning cycle, said updating being effected after each set of N scanning cycles, where N is an integer greater than or equal to 1, by substituting the stored reference signals by respective sampled output signals.

13. A system as claimed in claim 7 in which the scanning system includes an anamorphic lens providing an instantaneous field of view whose major and minor dimensions are in the ratio of at least 50:1, the minor dimension extending in the direction of scanning.

14. A system as claimed in claim 13 in which said ratio is in the range from 120:1 to 220:1.

15. A system as clained in claim 14 in which the angular extent of the major dimension of the instantaneous field of view is in the range of 90° to 220°.

16. A system as claimed in claim 13 in which the angular extent of the major dimension of the instantaneous field of view is in the range of 90° to 220°.

17. A system as claimed in claim 13 in which the scanning means is operable to scan said instantaneous field of view cyclically at a rate greater than one complete scanning cycle per second.

18. Apparatus for monitoring infrared emissions comprising sensor means responsive to infrared radiation for producing an electrical output related to the intensity of infrared radiation incident thereon, scanning means for effecting a cyclical scan to provide the sensor means, in use of the apparatus, repeatedly with an overall field of view encompassing an area under surveillance, said scanning means including an anamorphic lens means for providing said sensor means with a refracted instantaneous field of view which is scanned in a direction generally orthogonal to its wide angle of view to provide the sensor means with said overall field of view, means for analyzing the outputs of the sensor means with reference to a predetermined threshold value or values to detect within said overall field of view arising sources of infrared radiation representing potentially hazardous conditions, and means for generating an actuating signal in the event of detection of such sources.

19. Apparatus as claimed in claim 18 including means for testing said sensor means, said testing means being operable to suppress said actuating signal only in response to detection of a source(s) by said analyzing means within a predetermined zone or zones of the scanned field of view, said actuating signal being generated only in response to potentially hazardous sources lying outside said predetermined zone(s).

20. Apparatus as claimed in claim 18 in which said analyzing means includes means for repeatedly sampling the output of the sensor means in the course of each scanning cycle to produce a predetermined number of sampled signals each corresponding to successive instantaneous fields of view, store means for storing a number of reference signals each corresponding to a respective one of said successive instantaneous fields of view and collectively forming a reference radiation profile for the overall field of view, means for comparing each sampled signal with the associated stored reference signal to determine whether or not the difference therebetween exceeds the threshold value or a respective threshold value, means for updating the stored reference profile after each set of N scanning cycles, where N is an integer greater than or equal to 1, by substituting the stored reference signals by respective sampled output signals.

21. Apparatus for monitoring infrared emissions comprising:
(a) sensor means responsive to infrared radiation for producing an electrical output related to the intensity of infrared radiation incident thereon;
(b) scanning means for effecting a cyclical scan to provide the sensor means, in use of the apparatus, repeatedly with an overall field of view encompassing an area under surveillance, said scanning means comprising a support, a scanning head mounted on the support for rotation about a predetermined axis, drive means for effecting continuous rotation of the scanning head about said predetermined axis, an anamorphic lens mounted by the scanning head at a location spaced radially outwardly from said predetermined axis and so that its wide angle of view extends in a plane which contains or is parallel to said predetermined axis of rotation, and beam focussing and deflecting optical components for effecting focussing of the infrared radiation refracted radially inwardly from said lens and deflecting the same along said predetermined axis for reception by said sensor means;
(c) means for analyzing the outputs of the sensor means with reference to a predetermined threshold value or values to detect within said overall field of view arising sources of infrared radiation representing potentially hazardous conditions; and
(d) means for generating an actuating signal in the event of detection of such sources.

22. Apparatus as claimed in claim 21 in which the ratio of the wide and narrow angles of the instantaneous field of view subtended by said anamorphic lens is at least 50:1.

23. Apparatus as claimed in claim 22 in which said ratio is in the range from 120:1 to 220:1.

24. Apparatus as claimed in claim 23 in which the wide angle of the instantaneous field of view subtended by said anamorphic lens is in the range of 90° to 220°.

25. Apparatus as claimed in claim 22 in which the wide angle of the instantaneous field of view subtended by said anamorphic lens is in the range of 90° to 220°.

26. Apparatus as claimed in claim 21 in which said optical components comprise a beam-folding mirror for deflecting the radially inwardly refracted radiation from said anamorphic lens along said predetermined axis and a focussing lens interposed between the mirror and the sensor.

27. Apparatus for monitoring infrared emissions comprising:
(a) sensor means responsive to infrared radiation for producing an electrical output related to the intensity of infrared radiation incident thereon;
(b) scanning means for effecting a cyclical scan to provide the sensor means, in use of the apparatus, repeatedly with an overall field of view encompassing an area under surveillance, said scanning means including an anamorphic lens for providing said sensor means with an instantaneous field of view which is scanned in a direction generally orthogonal to its wide angle of view to provide the sensor means with said overall field of view;
(c) means for analyzing the outputs of the sensor means with reference to rate of change of temperature to discriminate between potentially hazardous sources of infrared radiation giving rise to rapid changes in levels of radiation emitted and non-hazardous sources of infrared radiation giving rise to slowly varying changes in levels of radiation emitted; and
(d) means for generating actuating signals in the event of detection of such sources.

* * * * *